Patented May 24, 1932

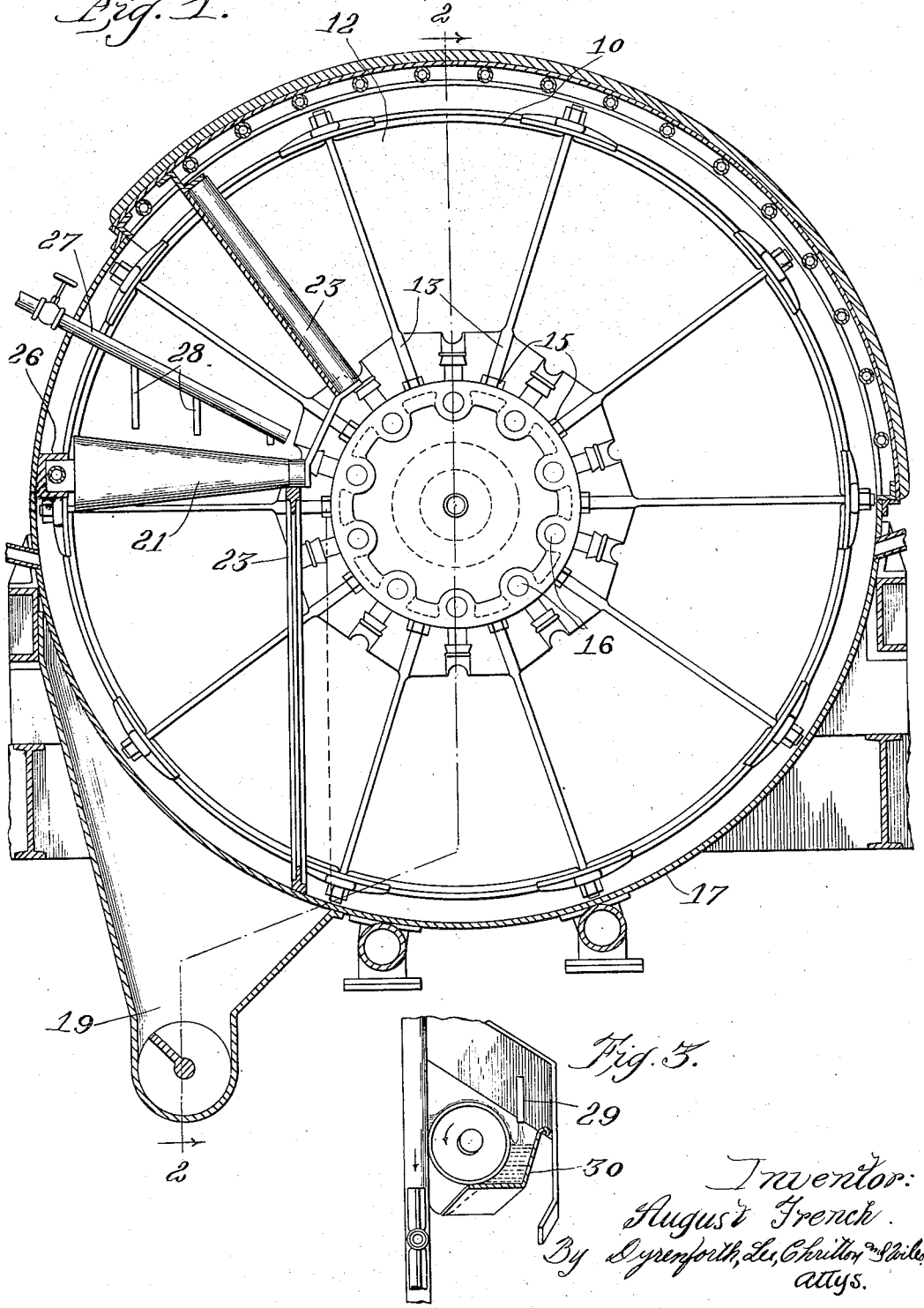

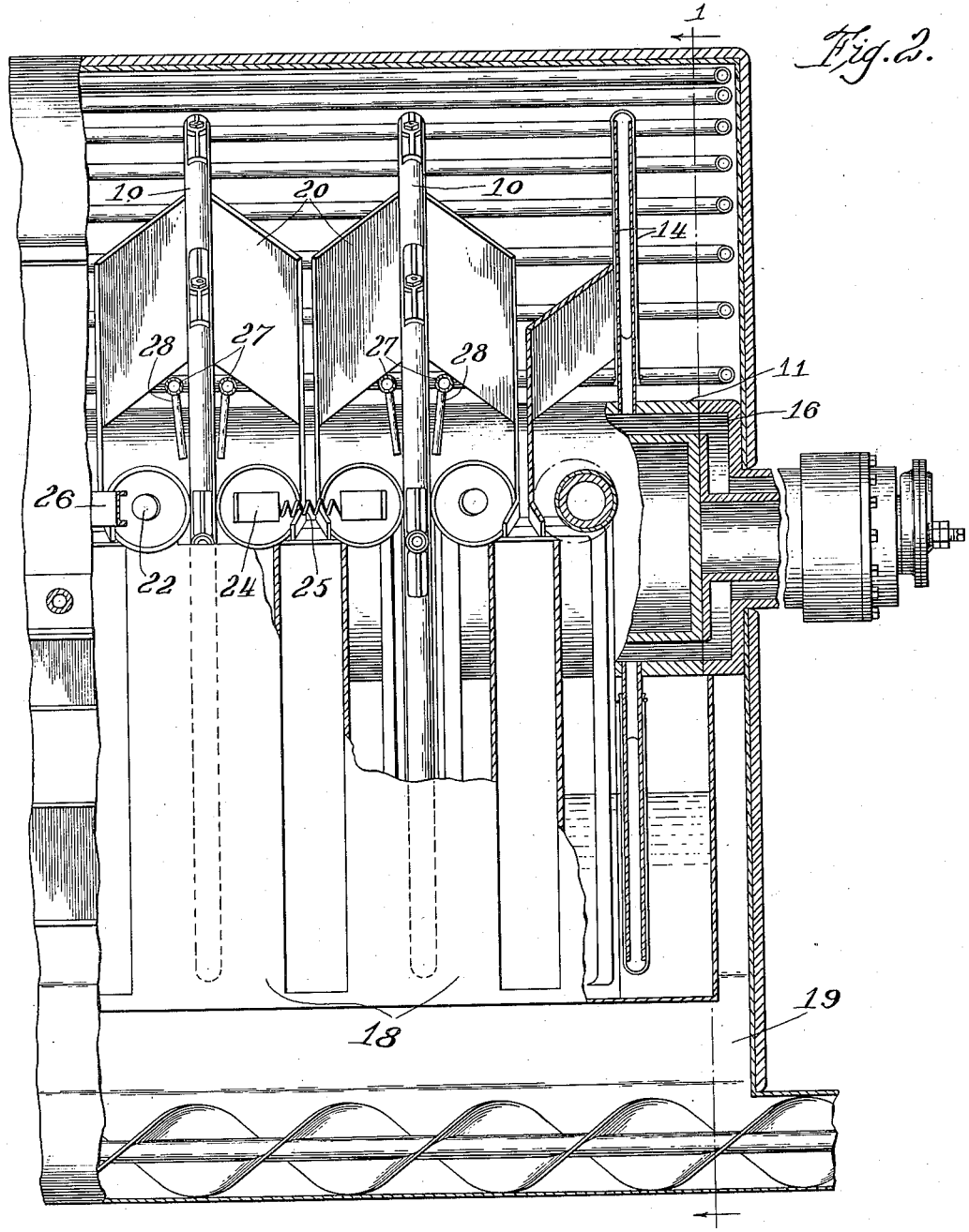

1,859,295

UNITED STATES PATENT OFFICE

AUGUST FRENCH, OF HAMMOND, INDIANA, ASSIGNOR TO STANDARD OIL COMPANY, OF WHITING, INDIANA, A CORPORATION OF INDIANA

PRECOATING DEVICE

Application filed September 11, 1929. Serial No. 391,855.

This invention relates to improvements in the removal of wax from hydrocarbon oils, and more particularly higher melting paraffin waxes from chilled viscous lubricating oils, or solutions thereof, by means of continuous rotating drum or disc filters.

One of the objects of the invention is to provide simple and effective means for distributing or depositing a precoating material in an even and uniform layer upon the surface of the rotating filter or filter sectors, so as to aid in the removal of the waxy material which forms a cake upon the precoating layer during the filtering operation. The advantages of the precoating process are set forth more fully in có-pending application, Serial Number 375,147, filed July 1, 1929. Great difficulty has been experienced in attempting to apply the precoating material evenly to the surfaces of the filter sectors, and particularly sectors upon disc type of filters, because the linear velocity of the filter surface at the outside of the disc is greater than at the inside of the disc.

The present invention relates to improvements in apparatus which enable the coating material to be uniformly and evenly distributed over the filtering surfaces and will be fully understood from the following description, illustrated by the accompanying drawings, in which—

Fig. 1 is a vertical sectional view transversely through a continuous filter device of the rotating disc type;

Fig. 2 is a vertical sectional view horizontally through a part of the apparatus on the line 2; and Fig. 3 is a sectional detail view showing a modified form of apparatus for supplying precoating material to the roller and filter sectors.

Referring more particularly to the drawings, the numeral 10 indicates the individual filter discs or frames, mounted on the horizontal rotating drum 11. The filter discs 10 are of a common type, well known in the industry, being made up of sector-shaped sections 12 between the radial supporting members 13, there being a filter medium, either of textile or metal cloth 14, on each face of each section.

The interior of each filter section 12 communicates through pipe 15 with a longitudinal channel 16 extending axially of the drum 11. The drum 11 and the discs 10 revolve counter-clockwise, as viewed in Fig. 1, in a container of the usual type. This container is made up of a main pan 17, to which are attached, on the discharge side of the filter, a plurality of narrow pans 18, of which there is one for each of the rotating discs. Spaces are provided between these narrow pans to permit the wax-containing material removed from the discs to drop into the container trough 19.

In the operation of the above described apparatus, as the discs 10 rotate, each sector on the discs is subjected in succession to a cycle of operations wherein it is first coated under suction with a thin, even layer of an inert, finely divided, solid material, such as kieselguhr, filter clay, diatomaceous earth or the like; it then travels through the body of chilled wax-containing oils in the pans 18 and 17 while suction is applied to draw wax-free oil through the sectors of the filter and leave on each sector a wax-containing coating; and finally, the wax-containing coating is removed by scraping or other suitable means; the cycle being then repeated.

After leaving the oil solution, the sectors are maintained under internal suction for a period, in order to remove as much oil as possible from the wax-containing face of the respective sectors, and the sectors are then subjected to internal air pressure while they pass by the scrapers 20, which remove the wax-containing material and leave the sectors in condition for a repetition of the cycle. In ordinary practice, a preliminary coating of the finely divided inert material is applied to each sector once in each cycle; however, if desired, such application may be made only once in every two or three cycles, or in any other predetermined number of cycles.

In order to secure an even and uniform distribution of the preliminary covering material, I prefer to employ means which will maintain a pool of the material in contact with the outer surface of the filter sectors as they rotate. In the illustration given, a conical roller 21 is supported adjacent to, or in light rolling contact with, the outer surface of the sectors 12. The roller 21 is preferably formed of canvas, or similar soft or yielding material, and is supported upon shaft 22. The inner end of shaft 22 is rotatably supported in frame 23, which is in turn secured to the outer shell 17. The outer end of shaft 22 is supported in a journal block 24.

In the preferred form shown in Fig. 2, a pair of journal blocks engaging the shafts of adjacent rollers between a pair of filter discs, are held apart and pressed toward the surface of the filter sectors by a spring 25, or other suitable means. The journal blocks are held against vertical movement by a guide channel 26, which extends longitudinally of the filter box or casing.

In applying the material to the surface of the filter sectors, it is preferably mixed in a wax-free oil, such as clear filtrate oil derived from oil of the same character as that subjected to filtration. This oil slurry is then fed through valve-controlled pipe 27 and nipples 28 into the trough 29 formed between the roller and the filter sector. Preferably, the nipples 28 are spaced closer together near the outer end of pipe 27, so as to distribute more covering material upon the outer and larger areas of the filter sectors. Since the linear velocity of the filter surface is greater at the outside of the disc, it is preferred to use a conical roller with the base of the cone at the outside, in order to have the roller and disc moving at the same speed at all contact points.

In the operation of the distributing apparatus, the conical rollers 21, which are held in yielding contact with the filter sectors by spring 25, rotate with the filter discs. The oil slurry covering, fed through pipe 27 and nipples 28, forms a pool between the roller and filter sector, which, being subjected to the suction of the apparatus, forms an even layer upon the moving surface of the filter. The action of the roller, as it moves with the surface of the filter, serves also to distribute the precoating material evenly upon the filter surface.

In the modified form illustrated in Fig. 3, the oil slurry is discharged through a conduit 29 into a trough 30, which is supported against the roller on its outer side. The roller, rotating in the direction of the arrow, carries the material and deposits it against the surface of the filter sector.

The foregoing detailed description has been given for clearness of understanding only, and no unnecessary limitations should be understood therefrom, but the appended claims should be construed as broadly as permissible, in view of the prior art.

I claim:

1. In a device of the character set forth, a rotatably mounted filter, means for supplying a coating material for the filtering surface of said filter, rotatable means for maintaining said material in a pool in contact with said surface, and means for rotating said filter.

2. In a device of the character set forth, a plurality of filter discs rotatably mounted, means for rotating said discs, rollers rotatably supported between a pair of said discs, means for supplying a coating material to said discs, and spring means connecting said rollers and serving to yieldingly hold them adjacent the surfaces of said pair of discs.

3. In a device of the character set forth, a filter shell, a pair of rotatably mounted filter discs, means for rotating said discs, means for supplying coating material to said discs, a pair of rollers between said discs having their inner ends rotatably supported by said filter shell, and having their outer ends rotatably and yieldingly held against said discs and against vertical movement.

4. In a device of the character set forth, a rotatably mounted filter disc equipped with filter sectors, means for rotating said disc, means for supplying a coating material to the surface of said sectors, and a rotatably mounted member adapted to spread said coating material uniformly over the surface of said sectors.

5. In a device of the character set forth, a filter disc rotatably mounted and equipped with filter sectors, a conical roller rotatably supported against said sectors, a trough supported adjacent the outer side said roller, means for supplying a coating material to said trough, and means for rotating said filter disc, said trough being adapted to support said coating material in contact with said roller.

6. In a device of the character set forth, a rotatably mounted filter disc equipped with filter sectors, means for rotating said disc, means for supplying coating material, and a movable member adapted to distribute said coating material over the surfaces of said sectors, said member being positioned adjacent the surfaces of said sectors at corresponding points of said member and said surfaces, moving at substantially the same linear velocity.

7. In a filter, a vertical disc provided with a porous filtering surface and adapted to rotate partially submerged in a bath of slurry, means for causing liquid to flow into the disc through said porous filtering surface, means for removing solids from said surface, means for maintaining a body of slurry in contact with said surface at a point above the level of the said bath of slurry, said means comprising a rotatable member held in continuous moving contact with said surface.

8. In a rotating vertical disc type filter of the character set forth, a rotatably mounted filter disc, and a roller rotatably mounted adjacent the face of said filter disc, said roller and disc face providing between them a substantially horizontal trough adapted to contain a body of slurry.

9. In an apparatus of the character set forth, a rotatably mounted filter disc, means for rotating said filter, a conical roller rotatably supported adjacent said filter, said disc and said roller providing between them a trough and means for supplying coating material to said trough.

10. In an apparatus of the character set forth, a rotatably mounted filter disc, a roller rotatably supported in light rolling contact therewith, said disc and roller providing between them a trough, means for rotating said disc, and means adapted to deliver precoating material to the trough.

In witness whereof I have hereunto set my hand this 29th day of August, 1929.

AUGUST FRENCH.